(12) United States Patent
Ferrarotti

(10) Patent No.: US 11,828,304 B1
(45) Date of Patent: Nov. 28, 2023

(54) PRESSURE REGULATING VALVE

(71) Applicant: Hamilton Sundstrand Corporation, Charlotte, NC (US)

(72) Inventor: Michael Ferrarotti, Durham, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/664,153

(22) Filed: May 19, 2022

(51) Int. Cl.
*F15B 13/04* (2006.01)
*F16K 11/07* (2006.01)

(52) U.S. Cl.
CPC ...... *F15B 13/0402* (2013.01); *F16K 11/0716* (2013.01)

(58) Field of Classification Search
CPC .................. F16K 11/0716; F15B 13/0402
See application file for complete search history.

(56) References Cited

U.S. PATENT DOCUMENTS

| | | | |
|---|---|---|---|
| 1,775,856 A * | 9/1930 | Hauser ................ | F16K 11/0716 137/625.48 |
| 6,321,527 B1 | 11/2001 | Dyer et al. | |
| 8,172,551 B2 | 5/2012 | Baker | |
| 8,919,094 B2 | 12/2014 | Haugsjaahabink | |
| 11,098,812 B2 | 8/2021 | Kubo et al. | |
| 2002/0043287 A1* | 4/2002 | Beyrak ..................... | F16K 3/26 137/625.68 |
| 2009/0020718 A1* | 1/2009 | Stallmann ........... | F16K 11/0716 251/324 |
| 2011/0309281 A1* | 12/2011 | Hoppe ................ | F16K 11/0716 251/324 |
| 2015/0083133 A1* | 3/2015 | Dunn ................... | A61M 39/223 137/625.68 |
| 2020/0103037 A1* | 4/2020 | Apperger .............. | F15B 11/055 |

\* cited by examiner

*Primary Examiner* — Kelsey E Cary
(74) *Attorney, Agent, or Firm* — Kinney & Lange, P. A.

(57) ABSTRACT

A pressure regulating valve includes an inlet, an outlet, an internal cavity, a first regulating window, and a second regulating window. Pressurized fluid enters the valve through the inlet at a first pressure, the fluid flows through the first regulating window into and through the internal cavity, and then the fluid flows out through the outlet at a second pressure which is lower than the first pressure. The second regulating window of the valve adds a leakage network that prevents pressure spikes within the valve. Further, the second regulating window is only utilized when the fluid pressure within the valve reaches a pressure limit, aiding in maintaining the desired regulated pressure.

19 Claims, 4 Drawing Sheets

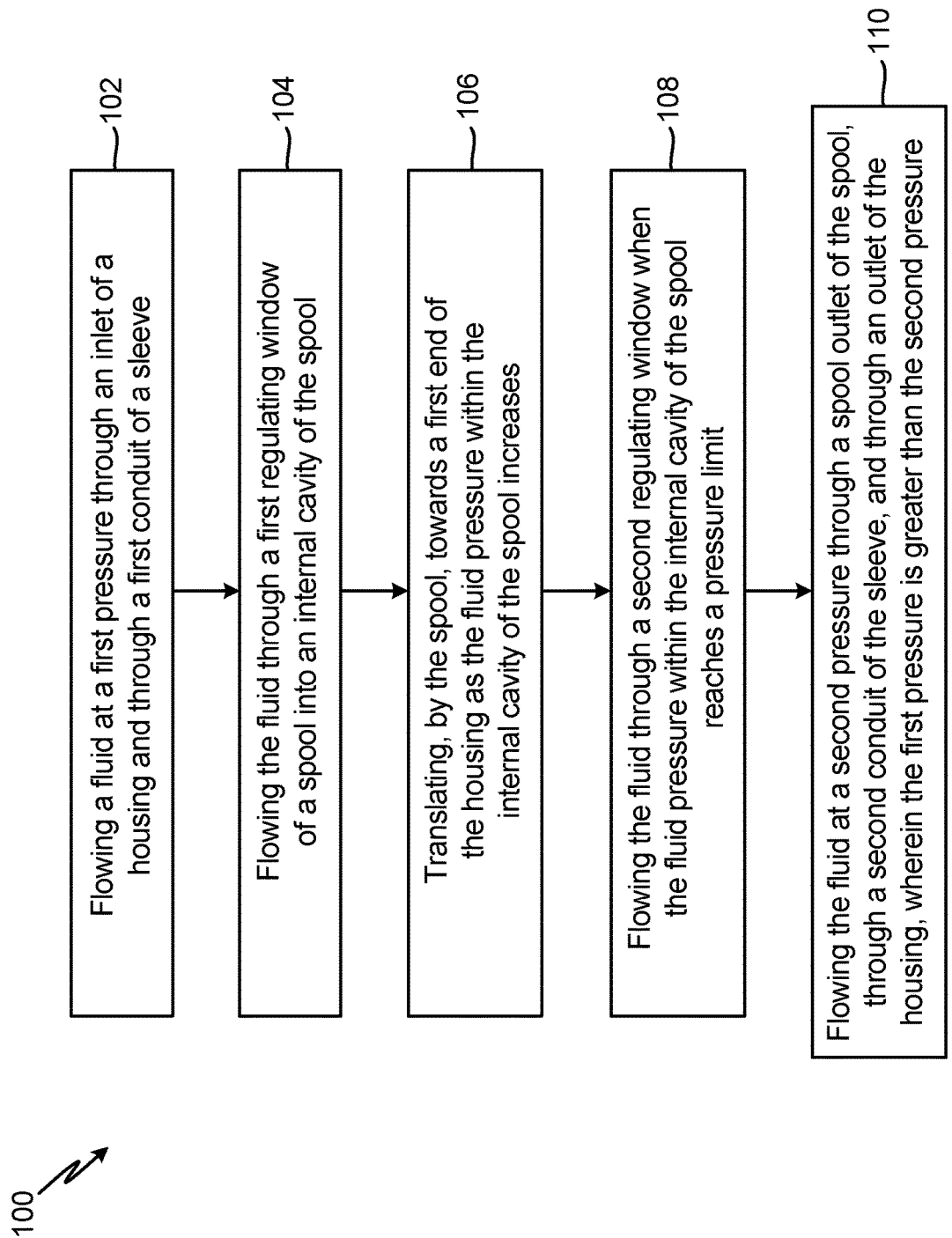

PRESSURE REGULATING VALVE

BACKGROUND

The present invention relates to pressure regulating valves and, more particularly, to regulating windows within the pressure regulating valves.

Pressure regulating valves are valves that are designed to adjust the pressure of a fluid or gas within a system to a desired working pressure. In some examples, pressure regulating valves receive a fluid or gas at a high pressure and the pressure regulating valve is configured to lower the output pressure of the fluid or gas before the fluid or gas flows downstream to other components of the system. Traditional pressure regulating valves include an inlet, an outlet, and a metering device positioned between the inlet and the outlet to adjust the pressure of the fluid or gas. At high pressures and temperatures, the metering device may not be capable of lowering the fluid or gas pressure to the desired working pressure and the metering device can completely close, causing a pressure spike within the valve. The pressure spike can impact the accuracy of the pressure regulating valve and cause damage to the overall system. As such, it is desirable to prevent a pressure spike within the pressure regulating valve and the overall system.

SUMMARY

According to one aspect of the disclosure, a pressure regulating valve for use in a fluid system is disclosed. The pressure regulating valve includes a housing including an inlet and an outlet. The inlet is fluidly coupled to a first fluid channel and the outlet is fluidly coupled to a second fluid channel. A sleeve is positioned within the housing and the sleeve includes a first conduit and a second conduit. A spool is slidingly positioned within the sleeve and the spool includes an internal cavity, a first regulating window, a second regulating window, and a spool outlet. The internal cavity is positioned within an outer wall of the spool and formed by the outer wall of the spool. The first regulating window fluidly couples the internal cavity of the spool and the first conduit of the sleeve. The second regulating window fluidly couples the internal cavity of the spool to a drain conduit. The spool outlet fluidly couples the internal cavity of the spool and the second conduit of the sleeve.

According to another aspect of the disclosure, a method of operating a pressure regulating valve within a fluid flow system is disclosed. The method includes the following steps: flowing a fluid at a first pressure through an inlet of a housing and through a first conduit of a sleeve; flowing the fluid through a first regulating window of a spool into an internal cavity of the spool; translating, by the spool, towards a first end of the housing as the fluid pressure within the internal cavity of the spool increases; flowing the fluid through a second regulating window when the fluid pressure within the internal cavity of the spool reaches a pressure limit; and flowing the fluid at a second pressure through a spool outlet of the spool, through a second conduit of the sleeve, and through an outlet of the housing, wherein the first pressure is greater than the second pressure.

BRIEF DESCRIPTION OF THE DRAWINGS

FIG. 4 is a flowchart illustrating a method of operating an exemplary pressure regulating valve within a fluid flow system

DETAILED DESCRIPTION

Figure 1:
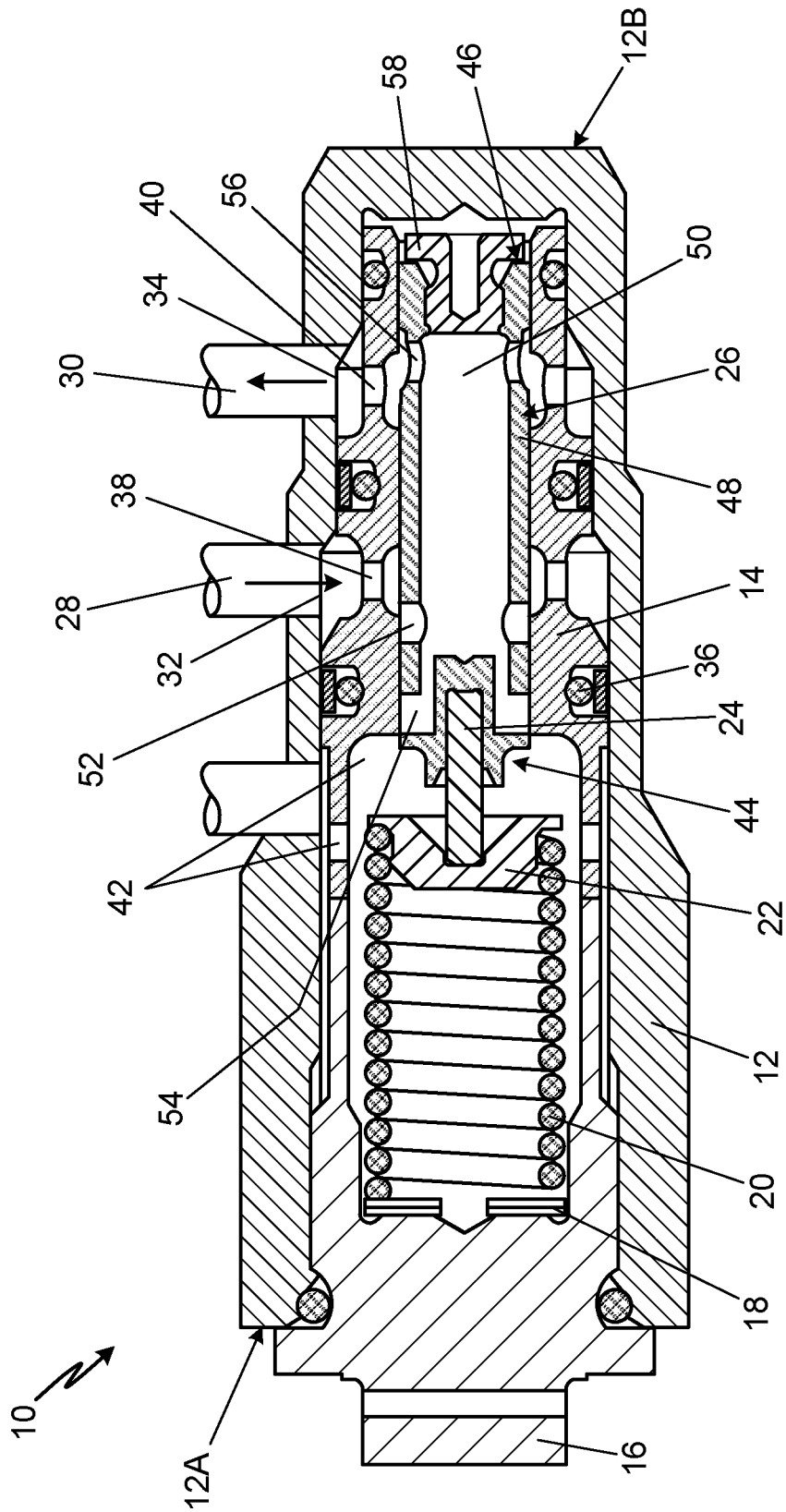
FIG. 1 is a cross-sectional view of an exemplary pressure regulating valve in a first position.
Figure 2:
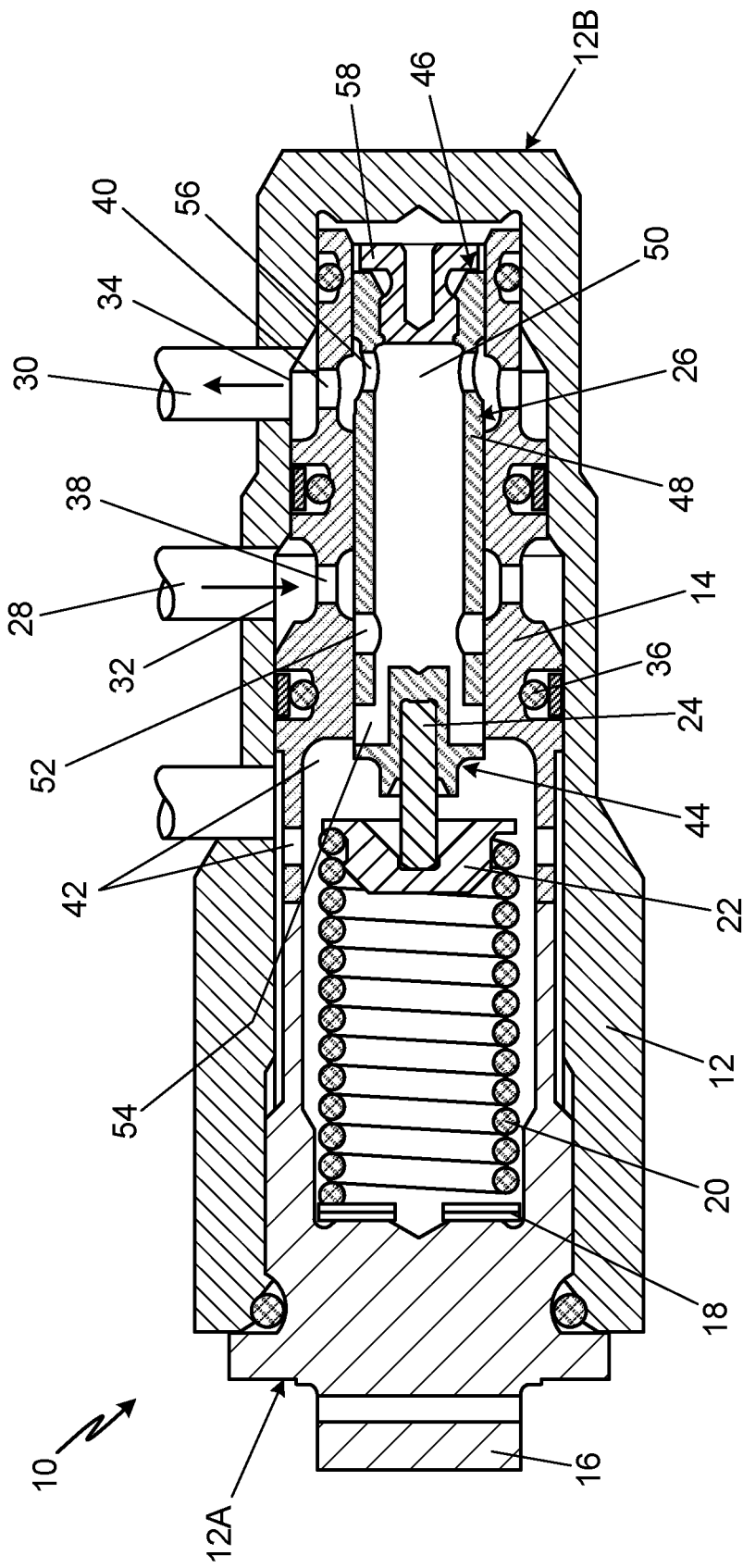
FIG. 2 is a cross-sectional view of the exemplary pressure regulating valve of FIG. 1 in a second position.
Figure 3:
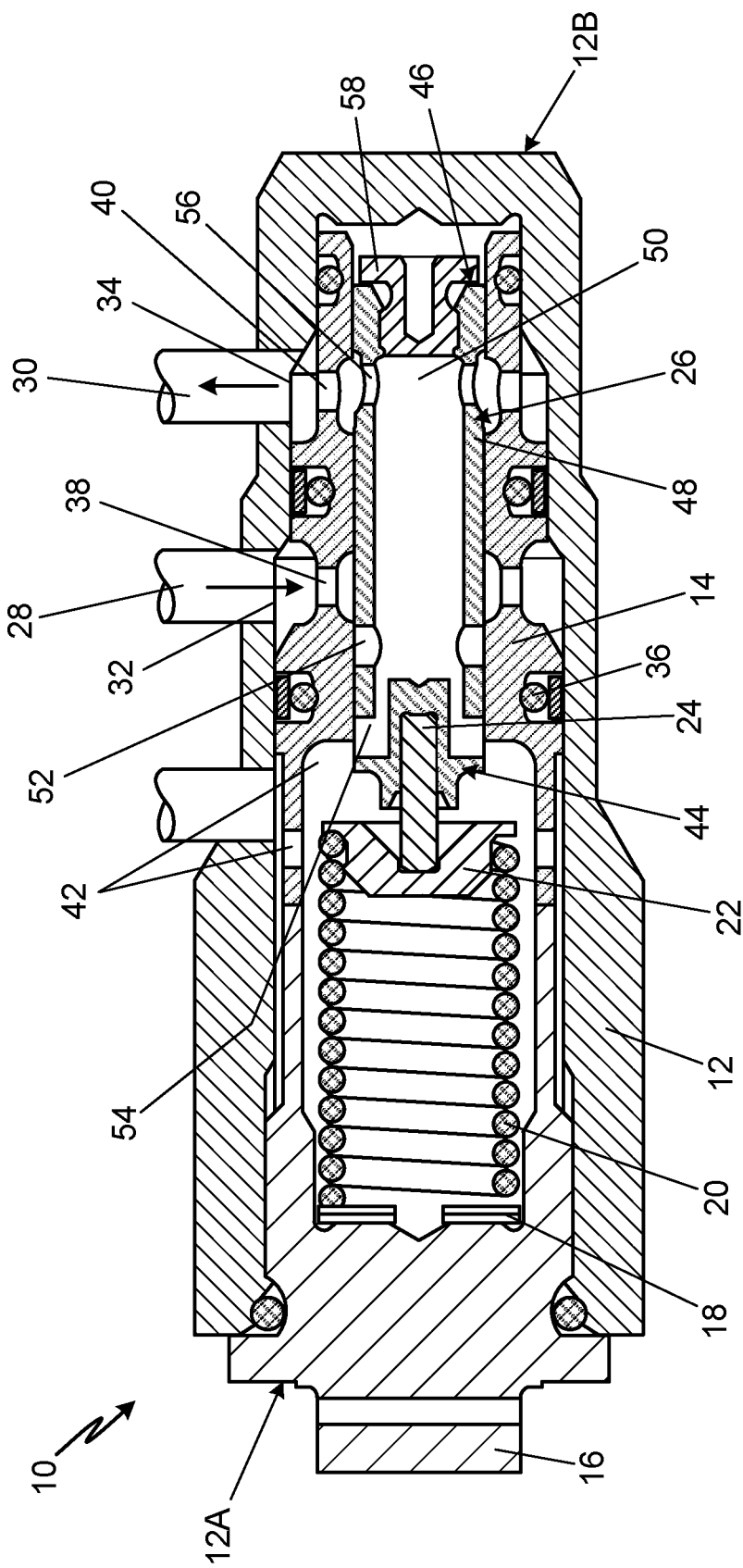
FIG. 3 is a cross-sectional view of the exemplary pressure regulating valve of FIG. 1 in a third position.

FIG. 1 is a cross-sectional view of pressure regulating valve 10 in a first position. FIG. 2 is a cross-sectional view of pressure regulating valve 10 in a second position. FIG. 3 is a cross-sectional view of pressure regulating valve 10 in a third position. FIGS. 1-3 will be discussed together. Further, pressure regulating valve 10 will hereinafter be referred to as "valve 10", but it is to be understood that the phrase "valve 10" refers to pressure regulating valve 10. Valve 10 is pressure regulating valve, and as such, is configured to adjust the pressure of a fluid within a fluid system to a desired working pressure. In some examples, valve 10 receives a fluid at an elevated pressure and valve 10 reduces the output pressure of the fluid before the fluid flows downstream to other components of the system. In other examples, valve 10 can receive a fluid at a reduced pressure and valve 10 can increase the output pressure of the fluid before the fluid flows downstream to other components of the system. Valve 10 can be used in any fluid flow system requiring pressure regulation for proper functioning of the fluid flow system. In one example, valve 10 can be used in a fuel system on an aircraft to adjust the pressure of the fuel flowing from a fuel tank onboard the aircraft to a combustor of a gas turbine engine.

Valve 10 includes housing 12, sleeve 14, cap 16, shims 18, spring 20, spring seat 22, pin 24, and spool 26. Further, valve 10 is fluidly coupled to first fluid channel 28 and second fluid channel 30. First fluid channel 28 can be a conduit, duct, pipe, tube, etc., that is configured to transfer a fluid to an inlet of valve 10 at a first pressure. Second fluid channel 30 can be a conduit, duct, pipe, tube, etc., that is configured to transfer a fluid exiting an outlet of valve 10 away from valve 10 at a second pressure. In the specific example discussed above, first fluid channel 28 can fluidly couple a fuel tank on an aircraft to valve 10, such that fuel can flow from the fuel tank to valve 10 at a first pressure. Second fluid channel 30 can fluidly couple valve 10 to a combustor of a gas turbine engine (not shown), such that the fuel can flow from valve 10 to the combustor of the gas turbine engine at a second pressure. In some examples, the first pressure is greater than the second pressure.

Housing 12 is the main body portion of valve 10 within which the other components of valve 10 are positioned. In the example shown in FIGS. 1-3, housing 12 has a generally hollow cylindrical shape such that an open cavity exists within outer walls of housing 12, providing a space for the other components of valve 10 to be positioned. Housing 12 includes inlet 32, outlet 34, first end 12A, and second end 12B. Inlet 32 is an aperture extending fully through the outer walls of housing 12 and inlet 32 is fluidly coupled to first fluid channel 28. Inlet 32 is configured to provide a location for a fluid to enter and flow into valve 10. Outlet 34 is an aperture extending fully through the outer walls of housing 12 and outlet 34 is fluidly coupled to second fluid channel 30. Outlet 34 is configured to provide a location for a fluid to exit and flow out of valve 10. In the example shown, inlet 32 and outlet 34 are positioned adjacent each other on the same side of housing 12, such that inlet 32 is positioned parallel with outlet 34. In another example, inlet 32 and outlet 34 can be positioned on opposite sides of housing 12 but may still be positioned parallel with each other. First end 12A is a first distal end of housing 12 and second end 12B is a second distal end of housing 12 positioned opposite first end 12A of housing 12.

Sleeve 14 is positioned within and fully surrounded by housing 12. Further, sleeve 14 is fixedly positioned within housing 12 and sleeve 14 is generally concentric with an internal surface of housing 12. As such, sleeve 14 can have a generally hollow cylindrical shape such that an open cavity exists within outer walls of sleeve 14, providing a space for the spool 26 to be positioned, discussed further below. A plurality of seals 36 can be positioned between sleeve 14 and the internal surface of housing 12 to prevent or minimize fluid leakage between sleeve 14 and housing 12 during operation of valve 10 within a fluid system. In the example shown, there are three annular seals 36 positioned between sleeve 14 and the internal surface of housing 12 to prevent or minimize fluid leakage between the components. In other examples, there can be more than or less than three annular seals 36 positioned between sleeve 14 and the internal surface of housing 12 to prevent or minimize fluid leakage between the components.

Sleeve 14 includes first conduit 38, second conduit 40, and drain conduit 42. First conduit 38 is an aperture extending fully through an outer wall of sleeve 14 and first conduit 38 is fluidly coupled to inlet 32 of housing 12. First conduit 38 is configured to provide a flow path for fluid to flow from inlet 32 of housing 12 through the outer walls of sleeve 14 and into spool 26, discussed further below. In some examples, first conduit 38 can be a through hole or aperture that extends through the outer walls of sleeve 14. In other examples, first conduit 38 can be an annular groove that extends around a circumference of sleeve 14 and at least one aperture can extend through the outer walls of sleeve 14 to fluidly couple first conduit 38 to spool 26. Second conduit 40 is an aperture extending fully through the outer walls of sleeve 14 and second conduit 40 is fluidly coupled to outlet 34 of housing 12. Second conduit 40 is configured to provide a flow path for fluid to flow from second conduit 40 through outlet 34 of housing 12 and out through second fluid channel 30 as the fluid exits valve 10. In some examples, second conduit 40 can be a through hole or aperture that extends through the outer walls of sleeve 14. In other examples, second conduit 40 can be an annular groove that extends around a circumference of sleeve 14 and at least one aperture can extend through the outer walls of sleeve 14 to fluidly couple second conduit 40 to spool 26.

Drain conduit 42 is positioned at an end of sleeve 14 closest to first end 12A of housing 12. Drain conduit 42 is an aperture extending fully through an outer wall of sleeve 14 and drain conduit 42 is fluidly coupled to a drain system (not shown) of the fluid system. Drain conduit 42 is configured to provide a flow path for excess fluid to flow out from valve 10 through a drain system of the fluid system. More specifically, fluid leaking or flowing out from spool 26 can flow through an end portion of sleeve 14 and into and through drain conduit 42 to be dispensed into the drain system of the fluid system, discussed further below. In some examples, drain conduit 42 can be a through hole or aperture that extends through the outer walls of sleeve 14. In other examples, drain conduit 42 can be an annular groove that extends around a circumference of sleeve 14 and at least one aperture can extend through the outer walls of sleeve 14 to fluidly couple drain conduit 42 to the drain system of the fluid system. In some examples, drain conduit 42 is positioned closest to first end 12A of housing 12, second conduit 40 is positioned closest to second end 12B of housing 12, and first conduit 38 is positioned between second conduit 40 and drain conduit 42.

Cap 16 is coupled to first end 12A of housing 12 and cap 16 extends at least partially within and partially outside of housing 12. In some examples, cap 16 can be coupled to housing 12 through a mating threaded connection. Further, in some examples a seal can be positioned between housing 12 and cap 16 to prevent fluid leakage between cap 16 and housing 12. A portion of cap 16 extends in an axial direction into housing 12 and the distal end of cap 16 within housing 12 is positioned adjacent and abuts a distal end of sleeve 14. Cap 16 is configured to secure sleeve 14 within housing 12. More specifically, cap 16 is configured to prevent sleeve 14 from translating and/or rotating within housing 12, ensuring sleeve 14 remains stationary within housing 12. Cap 16 can have a generally hollow cylindrical shape, such that cap 16 is concentric with housing 12. Further, the generally hollow cylindrical shape of cap 16 provides a space for the other components of valve 10 to be positioned.

A plurality of shims 18 and spring 20 are two such components of valve 10 that are positioned within the space or cavity of the portion of cap 16 extending axially into housing 12. Each of the plurality of shims 18 are positioned within cap 16 and are axially aligned with a central axis of cap 16, such that shims 18 are concentric with cap 16. The plurality of shims 18 are positioned adjacent an inner surface of cap 16 and one of the plurality of shims 18 abuts the inner surface of cap 16. The plurality of shims 18 are configured to be added and removed, as needed, to fine tune the spring load of spring 20, setting the regulating pressure of valve 10. More specifically, a greater number of shims 18 can be used to increase the spring load of spring 20, increasing the regulating pressure of valve 10. Further, a lower number of shims 18 can be used to decrease the spring load of spring 20, decreasing the regulating pressure of valve 10. The number of shims 18 within valve 10 will vary depending on the required regulating pressure of valve 10 for each specific fluid system. Spring 20 is positioned at least partially within cap 16 and spring 20 is axially aligned with the central axis of cap 16, such that spring 20 is concentric with cap 16. A first distal end of spring 20 abuts one of the plurality of shims 18 and a second distal end of spring 20 abuts spring seat 22. Spring 20 is configured to induce a force on spool 26 to force spool 26 towards second end 12B of housing 12, discussed further below.

Spring seat 22 is positioned at least partially within sleeve 14 and spring seat 22 abuts the second distal end of spring 20 on a first side of spring seat 22. In the example shown, spring seat 22 is an annular component with a generally V-shaped cross-section. The second distal end of spring 20 abuts the first side of spring seat 22 and forces spring seat 22 towards second end 12B of housing 12. Further, pin 24 is positioned at least partially within spring seat 22 and a second side of spring seat 22 abuts an end of pin 24. Pin 24 is a cylindrical component that extends between spring seat 22 and spool 26. As such, spring 20 is configured to induce a force onto spring seat 22 which then forces pin 24 towards spool 26, inducing a force onto spool 26. In other words, spring 20 is configured to induce a force onto spring seat 22 which in turn induces a force onto pin 24. The force induced onto pin 24 is transferred through pin 24 to spool 26 to push or force each of spring seat 22, pin 24, and spool 26 towards second end 12B of housing 12. When the fluid system is not operational, spring 20 forces spring seat 22, pin 24, and spool 26 towards second end 12B of housing 12 until spool 26 reaches a hard stop which prevents spool 26 from translating any closer to second end 12B. When the fluid system is operational, fluid enters spool 26 and the fluid pressure within spool 26 increases, causing spool 26 to translate towards first end 12A of housing 12, discussed further below.

Spool 26 is positioned within and fully surrounded by sleeve 14. Further, spool 26 is slidingly positioned within sleeve 14 such that spool 26 can translate in an axially direction toward and away from both first end 12A and second end 12B of housing 12. Spool 26 is concentric with an internal surface of sleeve 14, and spool 26 is also positioned within and concentric with an internal surface of housing 12. Spool 26 can have a generally hollow cylindrical shape such that an open cavity exists within spool 26 for fluid to flow within and through. Spool 26 includes first spool end 44, second spool end 46, outer walls 48, internal cavity 50, first regulating window 52, second regulating window 54, and spool outlet 56. First spool end 44 is a first distal end of spool 26 positioned closer to first end 12A of housing 12 and closer to spring 20 than any other feature of spool 26. Second spool end 46 is a second distal end of spool 26 positioned closer to second end 12B of housing 12 than any other feature of spool 26. First spool end 44 is positioned on an opposite side of spool 26 as second spool end 46. First spool end 44 of spool 26 is a closed end, preventing fluid from flowing out through first spool end 44. Second spool end 46 of spool 26 is an open end and plug 58 is positioned at least partially within and coupled to second spool end 46 to prevent fluid from flowing out through second spool end 46.

Outer walls 48 of spool 26 define the generally hollow cylindrical shape of spool 26. Further, outer walls 48 define and form internal cavity 50 within outer walls 48. As such, internal cavity 50 is positioned within outer walls 48 of spool 26 and internal cavity 50 is the space or cavity in which fluid flows within and through of spool 26. First regulating window 52 is an aperture that extends through outer walls 48 of spool 26 to internal cavity 50 of spool 26. First regulating window 52 fluidly couples internal cavity 50 of spool 26 to first conduit 38 of sleeve 14. Second regulating window 54 is an aperture that extends through outer walls 48 of spool 26 to internal cavity 50 of spool 26. Second regulating window 54 fluidly couples internal cavity 50 of spool 26 to drain conduit 42 of sleeve 14. Spool outlet 56 is an aperture that extends through outer walls 48 of spool 26 to internal cavity 50 of spool 26. Spool outlet 56 fluidly couples internal cavity 50 of spool 26 to second conduit 40 of sleeve 14. In the example shown, second regulating window 54 is positioned adjacent first spool end 44 of spool 26 and spool outlet 56 is positioned adjacent second spool end 46 of spool 26. Further, first regulating window 52 is positioned between second regulating window 54 and spool outlet 56.

In some examples, first regulating window 52, second regulating window 54, and spool outlet 56 can be through holes or apertures that extend fully through both outer walls 48 of spool 26. In other examples, first regulating window 52, second regulating window 54, and spool outlet 56 can each be annular grooves that extend around a circumference of spool 26 and at least one aperture can extend through outer walls 48 of spool 26 to fluidly couple first regulating window 52 to first conduit 38, second regulating window 54 to drain conduit 42, and spool outlet 56 to second conduit 40. Further, in some examples, each of first regulating window 52, second regulating window 54, and spool outlet 56 can be equal sized apertures. In other examples, each of first regulating window 52, second regulating window 54, and spool outlet 56 can be different sized apertures. In addition, in some examples, a central axis of each of first regulating window 52, second regulating window 54, spool outlet 56, first conduit 38, and second conduit 40 are positioned parallel with each other.

When the fluid flow system in which valve 10 is within is operational, fluid flows through first fluid channel 28 and into valve 10. More specifically, fluid flows from first fluid channel 28 through inlet 32 of housing 12, through first conduit 38 of sleeve 14, and through first regulating window 52 of spool 26, such that fluid flows into and fills internal cavity 50 of spool 26. During operation of the fluid flow system, the fluid within internal cavity 50 increases in pressure, causing spool 26 to translate towards first end 12A of housing 12. Spool 26 axially translates to regulate the fluid pressure within internal cavity 50 of spool 26 and within the overall valve 10. Spool 26 regulates the pressure within valve 10 by reducing or increasing the flow area through first regulating window 52.

Referring to FIG. 1, first regulating window 52 has a specific flow area to allow a specified amount of fluid to flow into internal cavity 50. The flow area of first regulating window 52 changes based on the positioning of first regulating window 52 relative to the outer walls of the stationary sleeve 14. The flow area of first regulating window 52 decreases as spool 26 translates towards first end 12A of housing 12, and the flow area of first regulating window 52 increases as spool 26 translates towards second end 12B of housing 12. The fluid that flows into internal cavity 50 proceeds by flowing out through spool outlet 56 of spool 26, second conduit 40 of sleeve 14, and outlet 34 of housing 12 at a regulated fluid pressure. As the pressure within internal cavity 50 increases, spool 26 translates towards first end 12A of housing 12 to decrease the flow area of first regulating window 52, which in turn reduces the fluid pressure within internal cavity 50 to maintain the regulated output fluid pressure of valve 10. When comparing FIG. 1 and FIG. 2, it is shown that the flow area of first regulating window 52 in FIG. 1 is greater than the flow area of first regulating window 52 in FIG. 2 due to spool 26 being positioned closer to first end 12A of housing 12 in FIG. 2. FIG. 2 illustrates a situation in which spool 26 has translated towards first end 12A of housing 12 to reduce the flow area of first regulating window 52 to regulate the pressure within and flowing out of valve 10.

In some scenarios, the pressure of the fluid flowing into previous valves can be at too high of pressures, leading to issues in previous pressure regulating valves. As shown in FIG. 3, when the incoming fluid pressure is too high, spool 26 can translate far enough towards first end 12A of housing 12 such that first regulating window 52 approaches fully closed (and in some examples it can reach fully closed). This causes the flow area of first regulating window 52 to reduce to a small enough flow area that the fluid leakage between the components of the valve exceeds the fluid flow through first regulating window 52. In turn, this can lead to issues such as pressure spikes within the system, which are undesirable because they can cause damage to components of the fluid flow system. Further, when the fluid leakage between the components of the valve reaches a high enough level, the valve is said to have lost control and can no longer regulate the fluid pressure as desired. In a situation where the valve can no longer reduce the fluid pressure before the fluid flows downstream to other components of the fluid system, the increased fluid pressure can damage components downstream of the valve. A previous solution to this scenario is to increase the size and pressure limits of the downstream components, which then increases the size and weight of components within the fluid flow system.

Valve 10 remedies the above described issues by including second regulating window 54. If the incoming fluid pressure is at too high of a pressure and spool 26 translates towards first end 12A of housing 12 such that first regulating window 52 approaches fully closed of reaches fully closed (FIG. 3), the fluid within internal cavity 50 can flow out through second regulating window 54 and drain conduit 42 to a drain system (not shown) of the fluid flow system. Flowing the fluid out through second regulating window 54 and drain conduit 42 causes the fluid pressure within spool 26 to decrease. In turn, as shown in FIG. 2, this causes spool 26 to translate towards second end 12B of housing 12 and first regulating window 52 to open and allow fluid to flow through first regulating window 52 into internal cavity 50 of spool 26. Second regulating window 54 provides a secondary flow path for fluid to flow to prevent pressure spikes and to prevent increased fluid leakage within valve 10. Further, second regulating window 54 aids in maintaining the desired pressure within spool 26 to control the pressure of the fluid flowing out through spool outlet 56, second conduit 40, and outlet 34 to downstream components of the fluid flow system.

As shown in FIG. 1, when the pressure of the fluid entering valve 10 is at a low enough level, second regulating window 54 can be completely closed, preventing fluid from flowing out through drain conduit 42. As shown in FIG. 2, as the fluid pressure within valve 10 increase, spool 26 translates towards first end 12A of housing 12. When the fluid pressure within valve 10 reaches a certain level and spool 26 has translated far enough towards first end 12A, second regulating window 54 opens, and fluid can flow out through drain conduit 42 to maintain the desired fluid pressure level within spool 26 and valve 10. Valve 10 can continuously translate towards and away from first end 12A to open and close second regulating window 54 to maintain the desired fluid pressure within valve. As shown in FIG. 3, if the fluid pressure within valve 10 reaches a pressure limit, first regulating window 52 can completely close and fluid can flow out through second regulating window 54 and drain conduit 42 to reduce the fluid pressure within valve 10, causing spool 26 to translate towards second end 12B of housing 12 to the position shown in FIG. 2.

As such, in at least one position first conduit 38 is in fluid communication with first regulating window 52 at the same time that second regulating window 54 is in fluid communication with drain conduit 42. This is achieved by having a maximum distance between outer edges first regulating window 52 and second regulating window 54 greater than a minimum distance between inner edges of first conduit 38 and drain conduit 42. The distance between first regulating window 52 and second regulating window 54 and between first conduit 38 and drain conduit 42 is strategically designed to only utilize second regulating window 54 and drain conduit 42 under high fluid pressure situations. This design prevents excessive drainage flow that would increase the overall flow requirements of the system. Further, the specific pressure levels and pressure limits in which second regulating window 54 opens and closes will vary depending on the fluid flow system in which valve 10 is utilized. Valve 10 can be used in many different fluid systems and the fluid pressures in each system can vary, such that the size of the components of valve 10 can be altered to function properly at each pressure level. Valve 10 is advantageous over previous pressure regulating valves because valve 10 with second regulating window 54 helps maintain control of the fluid pressure within valve 10 at high pressure levels.

FIG. 4 illustrates method 100 of operating valve 10 within a fluid flow system. Method 100 includes steps 102, 104, 106, 108, and 110, among other steps not specifically described. Step 102 includes flowing a fluid at a first pressure through inlet 32 of housing 12 and through first conduit 38 of sleeve 14. Step 104 includes flowing the fluid through first regulating window 52 of spool 26 into internal cavity 50 of spool 26. Step 106 includes translating spool 26 towards first end 12A of housing 12 as the fluid pressure within internal cavity 50 of spool 26 increases. Step 108 includes flowing the fluid through second regulating window 54 when the fluid pressure within internal cavity 50 of spool 26 reaches a pressure limit. The pressure limit can be a predefined value that is determined using mathematical calculations or physical testing data, among other options not specifically described. Step 110 includes flowing the fluid at a second pressure through spool outlet 56 of spool 26, through second conduit 40 of sleeve 14, and through outlet 34 of housing 12. In some examples, the first pressure is greater than the second pressure.

Method 100 can also include the following steps: translating spool 26 towards second end 12B of housing 12 as the fluid pressure within internal cavity 50 of spool 26 decreases; preventing fluid flow through second regulating window 54 when the fluid pressure within internal cavity 50 of spool 26 falls below a pressure limit; reducing a flow rate of the fluid flowing through first regulating window 52, by translating spool 26 towards first end 12A of housing 12, as the fluid pressure within internal cavity 50 of spool 26 approaches a pressure set value; and increasing a flow rate of the fluid flowing through first regulating window 52, by translating spool 26 towards second end 12B of housing 12, as the fluid pressure within internal cavity 50 of spool 26 recedes from a pressure set value. It is to be understood the described steps are examples steps of method 100, and method 100 can include further steps not specifically described.

Discussion of Possible Embodiments

The following are non-exclusive descriptions of possible embodiments of the present invention.

A pressure regulating valve for use in a fluid flow system, the pressure regulating valve comprising: a housing including an inlet and an outlet, wherein the inlet is fluidly coupled to a first fluid channel, and wherein the outlet is fluidly coupled to a second fluid channel; a sleeve positioned within the housing, the sleeve comprising a first conduit and a second conduit; and a spool slidingly positioned within the sleeve, wherein the spool comprises: an internal cavity positioned within an outer wall of the spool and formed by the outer wall of the spool; a first regulating window fluidly coupling the internal cavity of the spool and the first conduit of the sleeve; a second regulating window fluidly coupling the internal cavity of the spool to a drain conduit; and a spool outlet fluidly coupling the internal cavity of the spool and the second conduit of the sleeve.

The pressure regulating valve of the preceding paragraph can optionally include, additionally and/or alternatively, any one or more of the following features, configurations and/or additional components:

The sleeve is fixedly positioned within and concentric with an internal surface of the housing, and wherein the first conduit is fluidly coupled to the inlet of the housing and the second conduit is fluidly coupled to the outlet of the housing.

The first regulating window extends through the outer wall of the spool to the internal cavity of the spool; the second regulating window extends through the outer wall of the spool to the internal cavity of the spool; and the spool outlet extends through the outer wall of the spool to the internal cavity of the spool.

The spool is positioned within and concentric with an internal surface of the sleeve, and wherein the spool is positioned within and concentric with an internal surface of the housing.

The first regulating window, the second regulating window, and the spool outlet are apertures that extend fully through both outer walls of the spool; and the first regulating window, the second regulating window, and the spool outlet are equal sized apertures.

In at least one position the first conduit is in fluid communication with the first regulating window at the same time that the second regulating window is in fluid communication with the drain conduit such that a maximum distance between outer edges the first regulating window and the second regulating window is greater than a minimum distance between inner edges of the first conduit and the drain conduit.

A central axis of each of the first regulating window, the second regulating window, the spool outlet, the first conduit, and the second conduit are positioned parallel with each other.

The second regulating window is positioned adjacent a first spool end of the spool; the spool outlet is positioned adjacent a second spool end of the spool; and the first regulating window is positioned between the second regulating window and the spool outlet.

The first spool end is a closed end and the second spool end is an open end, and wherein a plug is positioned at least partially within and coupled to the second spool end.

A cap coupled to a first end of the housing, wherein the cap extends partially within and partially outside of the housing; a plurality of shims positioned within the cap and axially aligned with a central axis of the cap; a spring positioned at least partially within the cap and axially aligned with the central axis of the cap, wherein the spring abuts one of the plurality of shims at a first distal end of the spring; and a spring seat positioned at least partially within the sleeve, wherein the spring seat is configured to abut a second distal end of the spring on a first side of the spring seat and abut a pin on a second side of the spring seat, wherein the pin extends between the spring seat and the spool.

The spring is configured to induce a force on the spring seat and the pin to force the spool toward a second end of the housing, and wherein the spool is configured to translate towards the first end of the housing as the fluid pressure within the spool increases.

The following are further non-exclusive descriptions of possible embodiments of the present invention.

A method of operating a pressure regulating valve within a fluid flow system, the method comprising: flowing a fluid at a first pressure through an inlet of a housing and through a first conduit of a sleeve; flowing the fluid through a first regulating window of a spool into an internal cavity of the spool; translating, by the spool, towards a first end of the housing as the fluid pressure within the internal cavity of the spool increases; flowing the fluid through a second regulating window when the fluid pressure within the internal cavity of the spool reaches a pressure limit; and flowing the fluid at a second pressure through a spool outlet of the spool, through a second conduit of the sleeve, and through an outlet of the housing, wherein the first pressure is greater than the second pressure.

The method of the preceding paragraph can optionally include, additionally and/or alternatively, any one or more of the following features, configurations and/or additional components:

Translating, by the spool, towards a second end of the housing as the fluid pressure within the internal cavity of the spool decreases; and preventing fluid flow through the second regulating window when the fluid pressure within the internal cavity of the spool is below a pressure limit.

Reducing a flow rate of the fluid flowing through the first regulating window, by translating the spool towards the first end of the housing, as the fluid pressure within the internal cavity of the spool approaches a pressure set value.

Increasing a flow rate of the fluid flowing through the first regulating window, by translating the spool towards a second end of the housing, as the fluid pressure within the internal cavity of the spool recedes from a pressure set value.

The first regulating window extends through an outer wall of the spool to the internal cavity of the spool; the second regulating window extends through the outer wall of the spool to the internal cavity of the spool; and the spool outlet extends through the outer wall of the spool to the internal cavity of the spool.

The first regulating window, the second regulating window, and the spool outlet are apertures that extend fully through both outer walls of the spool; and the first regulating window, the second regulating window, and the spool outlet are equal sized apertures.

A maximum distance between outer edges the first regulating window and the second regulating window is greater than a minimum distance between inner edges of the first conduit and the drain conduit.

A central axis of each of the first regulating window, the second regulating window, the spool outlet, the first conduit, and the second conduit are positioned parallel with each other.

The second regulating window is positioned adjacent a first spool end of the spool; the spool outlet is positioned adjacent a second spool end of the spool; and the first regulating window is positioned between the second regulating window and the spool outlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure regulating valve for use in a fluid flow system, the pressure regulating valve comprising:
 a housing including an inlet and an outlet, wherein the inlet is fluidly coupled to a first fluid channel, and wherein the outlet is fluidly coupled to a second fluid channel;
 a sleeve positioned within the housing, the sleeve comprising a first conduit and a second conduit;

a cap coupled to a first end of the housing, wherein the cap extends partially within and partially outside of the housing;

a plurality of shims positioned within the cap and axially aligned with a central axis of the cap;

a spring positioned at least partially within the cap and axially aligned with the central axis of the cap, wherein the spring abuts one of the plurality of shims at a first distal end of the spring; and a spring seat positioned at least partially within the sleeve, wherein the spring seat is configured to abut a second distal end of the spring on a first side of the spring seat and abut a pin on a second side of the spring seat, wherein the pin extends between the spring seat and a spool slidingly positioned within the sleeve, wherein the spool comprises:
an internal cavity positioned within an outer wall of the spool and formed by the outer wall of the spool;
a first regulating window fluidly coupling the internal cavity of the spool and the first conduit of the sleeve;
a second regulating window fluidly coupling the internal cavity of the spool to a drain conduit; and
a spool outlet fluidly coupling the internal cavity of the spool and the second conduit of the sleeve.

2. The pressure regulating valve of claim 1, wherein the sleeve is fixedly positioned within and concentric with an internal surface of the housing, and wherein the first conduit is fluidly coupled to the inlet of the housing and the second conduit is fluidly coupled to the outlet of the housing.

3. The pressure regulating valve of claim 1, wherein:
the first regulating window extends through the outer wall of the spool to the internal cavity of the spool;
the second regulating window extends through the outer wall of the spool to the internal cavity of the spool; and
the spool outlet extends through the outer wall of the spool to the internal cavity of the spool.

4. The pressure regulating valve of claim 1, wherein the spool is positioned within and concentric with an internal surface of the sleeve, and wherein the spool is positioned within and concentric with an internal surface of the housing.

5. The pressure regulating valve of claim 1, wherein:
the first regulating window, the second regulating window, and the spool outlet are apertures that extend fully through the outer wall of the spool; and
the first regulating window, the second regulating window, and the spool outlet are equal sized apertures.

6. The pressure regulating valve of claim 1, wherein in at least one position the first conduit is in fluid communication with the first regulating window at the same time that the second regulating window is in fluid communication with the drain conduit such that a maximum distance between outer edges the first regulating window and the second regulating window is greater than a minimum distance between inner edges of the first conduit and the drain conduit.

7. The pressure regulating valve of claim 1, wherein a central axis of each of the first regulating window, the second regulating window, the spool outlet, the first conduit, and the second conduit are positioned parallel with each other.

8. The pressure regulating valve of claim 1, wherein:
the second regulating window is positioned adjacent a first spool end of the spool;
the spool outlet is positioned adjacent a second spool end of the spool; and
the first regulating window is positioned between the second regulating window and the spool outlet.

9. The pressure regulating valve of claim 8, wherein the first spool end is a closed end and the second spool end is an open end, and wherein a plug is positioned at least partially within and coupled to the second spool end.

10. The pressure regulating valve of claim 1, wherein the spring is configured to induce a force on the spring seat and the pin to force the spool toward a second end of the housing, and wherein the spool is configured to translate towards the first end of the housing as the fluid pressure within the spool increases.

11. A method of operating a pressure regulating valve within a fluid flow system, the method comprising:
flowing a fluid at a first pressure through an inlet of a housing and through a first conduit of a sleeve, wherein a cap is coupled to a first end of the housing such that the cap extends partially within and partially outside of the housing and a plurality of shims are positioned within the cap and axially aligned with a central axis of the cap;
flowing the fluid through a first regulating window of a spool into an internal cavity of the spool;
translating, by the spool, towards a first end of the housing as the fluid pressure within the internal cavity of the spool increases, wherein translating, by the spool, towards a first end of the housing as the fluid pressure within the internal cavity of the spool increases causes the spool to press against a pin extending between a spring seat and the spool, wherein the spring seat is positioned at least partially within a sleeve and is configured to abut a second distal end of a spring on a first side of the spring seat and the pin on a second side of the spring seat, wherein the spring is positioned at least partially within the cap and axially aligned with the central axis of the cap such that the spring abuts one of the plurality of shims at a first distal end of the spring;
flowing the fluid through a second regulating window when the fluid pressure within the internal cavity of the spool reaches a pressure limit, wherein the pressure limit is determined by a number of shims that make up the plurality of shims; and
flowing the fluid at a second pressure through a spool outlet of the spool, through a second conduit of the sleeve, and through an outlet of the housing, wherein the first pressure is greater than the second pressure.

12. The method of claim 11 and further comprising:
translating, by the spring applying pressure to the spool through the spring seat and the pin, towards a second end of the housing as the fluid pressure within the internal cavity of the spool decreases; and
preventing fluid flow through the second regulating window when the fluid pressure within the internal cavity of the spool is below a pressure limit.

13. The method of claim 11 and further comprising reducing a flow rate of the fluid flowing through the first regulating window, by translating the spool towards the first end of the housing, as the fluid pressure within the internal cavity of the spool approaches a pressure set value.

14. The method of claim 11 and further comprising increasing a flow rate of the fluid flowing through the first regulating window, by translating the spool towards a second end of the housing, as the fluid pressure within the internal cavity of the spool recedes from a pressure set value.

15. The method of claim 11, wherein:
the first regulating window extends through an outer wall of the spool to the internal cavity of the spool;
the second regulating window extends through the outer wall of the spool to the internal cavity of the spool; and
the spool outlet extends through the outer wall of the spool to the internal cavity of the spool.

16. The method of claim 15, wherein:
the first regulating window, the second regulating window, and the spool outlet are apertures that extend fully through the outer walls of the spool; and
the first regulating window, the second regulating window, and the spool outlet are equal sized apertures.

17. The method of claim 11, wherein a maximum distance between outer edges the first regulating window and the second regulating window is greater than a minimum distance between inner edges of the first conduit and the drain conduit.

18. The method of claim 11, wherein a central axis of each of the first regulating window, the second regulating window, the spool outlet, the first conduit, and the second conduit are positioned parallel with each other.

19. The method of claim 11, wherein:
the second regulating window is positioned adjacent a first spool end of the spool;
the spool outlet is positioned adjacent a second spool end of the spool; and
the first regulating window is positioned between the second regulating window and the spool outlet.

* * * * *